(12) United States Patent
Masukawa

(10) Patent No.: US 7,679,940 B2
(45) Date of Patent: Mar. 16, 2010

(54) THREE-PHASE VOLTAGE SOURCE INVERTER SYSTEM

(75) Inventor: Shigeo Masukawa, Tokyo (JP)

(73) Assignee: Tokyo Denki University, Tokyo (JP)

( * ) Notice: Subject to any disclaimer, the term of this patent is extended or adjusted under 35 U.S.C. 154(b) by 34 days.

(21) Appl. No.: 12/182,882

(22) Filed: Jul. 30, 2008

(65) Prior Publication Data
US 2009/0185405 A1 Jul. 23, 2009

(30) Foreign Application Priority Data
Jan. 21, 2008 (JP) ............................. 2008-010239

(51) Int. Cl.
H02M 5/458 (2006.01)
H02M 5/45 (2006.01)

(52) U.S. Cl. ............................. 363/34; 363/37; 363/98; 363/132

(58) Field of Classification Search ................... 363/34, 363/37, 35, 98, 131, 132
See application file for complete search history.

(56) References Cited

U.S. PATENT DOCUMENTS

| | | | | |
|---|---|---|---|---|
| 4,733,146 A | * | 3/1988 | Hamby | 388/847 |
| 5,155,675 A | * | 10/1992 | Maruyama et al. | 363/98 |
| 5,321,599 A | * | 6/1994 | Tanamachi et al. | 363/41 |
| 5,481,448 A | * | 1/1996 | Nakata et al. | 363/137 |

OTHER PUBLICATIONS

Nishida, Y., "New Passive and Hybrid Rectifier Topologies to Achieve Sinusoidal Utility Current and Controlled Output Voltage", 2005, pp. 1823-1829, Energy Electronic Laboratory, Department of Electrical and Electronics Engineering, College of Engineering, Nihon University, Japan.
Masukawa, et al., "An Improved Three-Phase Diode Rectifier For Reducing AC Line Current Harmonics", 7th *European Conference on Power Electronics and Applications EPE '97*, Sep. 1997, pp. 4.227-4.232, Trondheim, Norway.
Choi, S., "New Pulse Multiplication Technique Based on Six-Pulse Thyristor Converters for High-Power Applications", *IEEE Transactions on Industry Applications*, Jan./Feb. 2002, pp. 131-136, 38:1.

* cited by examiner

*Primary Examiner*—Bao Q Vu
(74) *Attorney, Agent, or Firm*—Foley & Lardner LLP

(57) ABSTRACT

The present invention provides a three-phase voltage source inverter system capable of obtaining a nearly sinusoidal output waveform while minimizing apparatus size increase and cost increases. The three-phase voltage source inverter system of the present invention is provided with: a three-phase inverter unit INV-M; and an auxiliary circuit 1 inserted between a direct-current power source and the three-phase inverter unit, including: dividing capacitors Cd1, Cd2 dividing a direct-current voltage of the direct-current power source; a single-phase inverter unit INV-A in which 60° ON-periods are set for upper switching elements S7, S8 in each phase of single-phase with an 80° delay, and 60° ON-periods are set for lower switching elements S9, S10 in each phase of single-phase with a 60° delay from the upper side switching elements and with an 80° delay between each phase; and an auxiliary transformer Ta.

1 Claim, 5 Drawing Sheets

THREE-PHASE VOLTAGE SOURCE INVERTER SYSTEM

CROSS-REFERENCES TO RELATED APPLICATIONS

The entire disclosure of Japanese Patent Application No. 2008-10239, filed on Jan. 21, 2008, is expressly incorporated herein by reference.

BACKGROUND

1. Technical Field

The present invention relates to a three-phase voltage source inverter system.

2. Related Art

A multistage-multiplex method has been known as a method for improving the output voltage waveforms of a three-phase inverter. For example, a three-phase inverter system having a configuration where three three-phase inverter units INV-1 through INV-3 are connected to a direct-current power source Ed by a three-stage cascade arrangement; Δ windings 101-1 through 101-3 in three-phase transformers T1-T3 are connected to three phases U, V, W of these three three-phase inverter units INV-1 through INV-3; and Y windings 102-1 through 102-3 in three-phase transformers T1-T3 respectively are the outputs of the U, V, W phases, as shown in FIG. 4, is used in order to obtain voltage having a staircase waveform consisting of 18 steps per cycle.

In this existing three-phase inverter system, the numbers of turns of the Δ windings 101-1 through 101-3 in the three-phase transformers T1-T3 utilized for phase shifts are made uniform respectively; the turn ratio of the Y windings 102-1 through 102-3 are set as A:B:C=1:0.742:0.395; the three-phase inverter units INV-1 through INV-3 are sequentially controlled with a phase difference of 20° delay; and then the output phase voltage vUN has a staircase waveform consisting of 18 steps per cycle, as shown in FIG. 5(a). Therefore, an output line-to-line voltage vUV can obtain a staircase waveform consisting of 18 steps per cycle, as shown in FIG. 5(b).

However, the existing three-phase inverter system has a problem that the more the output voltage waveform approaches a sinusoidal waveform, the more phase shift transformers and inverter units are needed, so a larger apparatus and cost increases cannot be avoided. For example, 18 switching elements and three three-phase transformers are needed to obtain the output voltage having 18 steps per cycle by a three-stage cascade arrangement shown in FIG. 4.

Meanwhile, for example, methods for improving a source current waveform by injecting higher harmonic waves into the source side of a three-phase rectifier circuit have been suggested in the research papers: "An Improved Three-Phase Diode Rectifier for Reducing AC Line Current Harmonics," in Conf. Rec. EPE'97, pp. 4.227-4.232, written by S. Masukawa and S. Iida; "New Multiplication Technique Based on Six-Pulse Thyristor Converters for High-Power Applications," IEEE Trans. Ind. Appl., Vol. 38, No. 1, pp. 131-136, 2002; written by Sewan Choi; and "New Passive and Hybrid Rectifier Topologies to Achieve Sinusoidal Utility Current and Controlled Output Voltage," in Conf. Rec. IPEC-Niigata 2005, pp. 1823-1829,2005, written by Y. Nishida. These methods have been considered for the rectifier circuit for an aircraft generator or an uninterrupted power supply (UPS), since it can obtain the same improvement effect of waveforms as that in the multistage-multiplex method simply by adding an auxiliary circuit with a minimal capacity for injecting the higher harmonic waves. However, no previous case in which this method is applied in the improvement of the output voltage waveform of an inverter has been found.

SUMMARY

The present invention has been devised in consideration of the problems in the above-described prior art, and it is an object of the present invention to provide a three-phase voltage source inverter system capable of obtaining a nearly sinusoidal output waveform while minimizing apparatus size increase and cost increases.

The three-phase voltage source inverter system of the present invention is provided with: a direct-current power source; a three-phase voltage source inverter apparatus including: a three-phase inverter unit in which ON-periods are respectively set to 120° for upper side switching elements in each of three phases with a 120° delay, and ON-periods are respectively set to 120° for lower side switching elements in each of the three phases with a 180° delay from the upper side switching elements and with a 120° delay between each phase; and a three-phase output transformer with a primary side Y winding connected to an output end in each of three phases of the three-phase inverter and a secondary side Δ winding; and an auxiliary circuit inserted between the direct-current power source and the three-phase voltage source inverter apparatus, including: a dividing capacitor dividing a direct-current voltage of the direct-current power source; a single-phase inverter unit in which ON-periods are respectively set to 60° for upper side switching elements in each phase of single-phase with an 80° delay, and ON-periods are respectively set to 60° for lower side switching elements in each phase of single-phase with a 60° delay from the upper side switching elements and with an 80° delay between each phase; and an auxiliary transformer in which a primary side winding is connected to a connection midpoint between upper and lower switching elements in each phase of the single-phase inverter unit, and a secondary side winding is connected between a connection midpoint of the dividing capacitor and a connection midpoint of a primary Y winding in the three-phase transformer.

According to the three-phase voltage source inverter system of the present invention, a output voltage waveform having 18 steps can be obtained with 10 switching elements and one three-phase transformer by adding one small single-phase transformer running at three times the output frequency and a capacitor dividing a direct-current power source into two voltages, and consequently a three-phase voltage source inverter system capable of obtaining a nearly sinusoidal output waveform while minimizing apparatus size increase and cost increases can be provided.

Furthermore, according to the three-phase voltage source inverter system of the present invention, a switching element for low frequency can be applied since the maximum switching frequency is three times the output frequency, and also a switching loss or switching noise can be reduced since the switching frequency is low.

DESCRIPTION OF EXEMPLARY EMBODIMENTS

The embodiments of the invention will be described below with reference to the attached drawings.

First Embodiment

Figure 1:
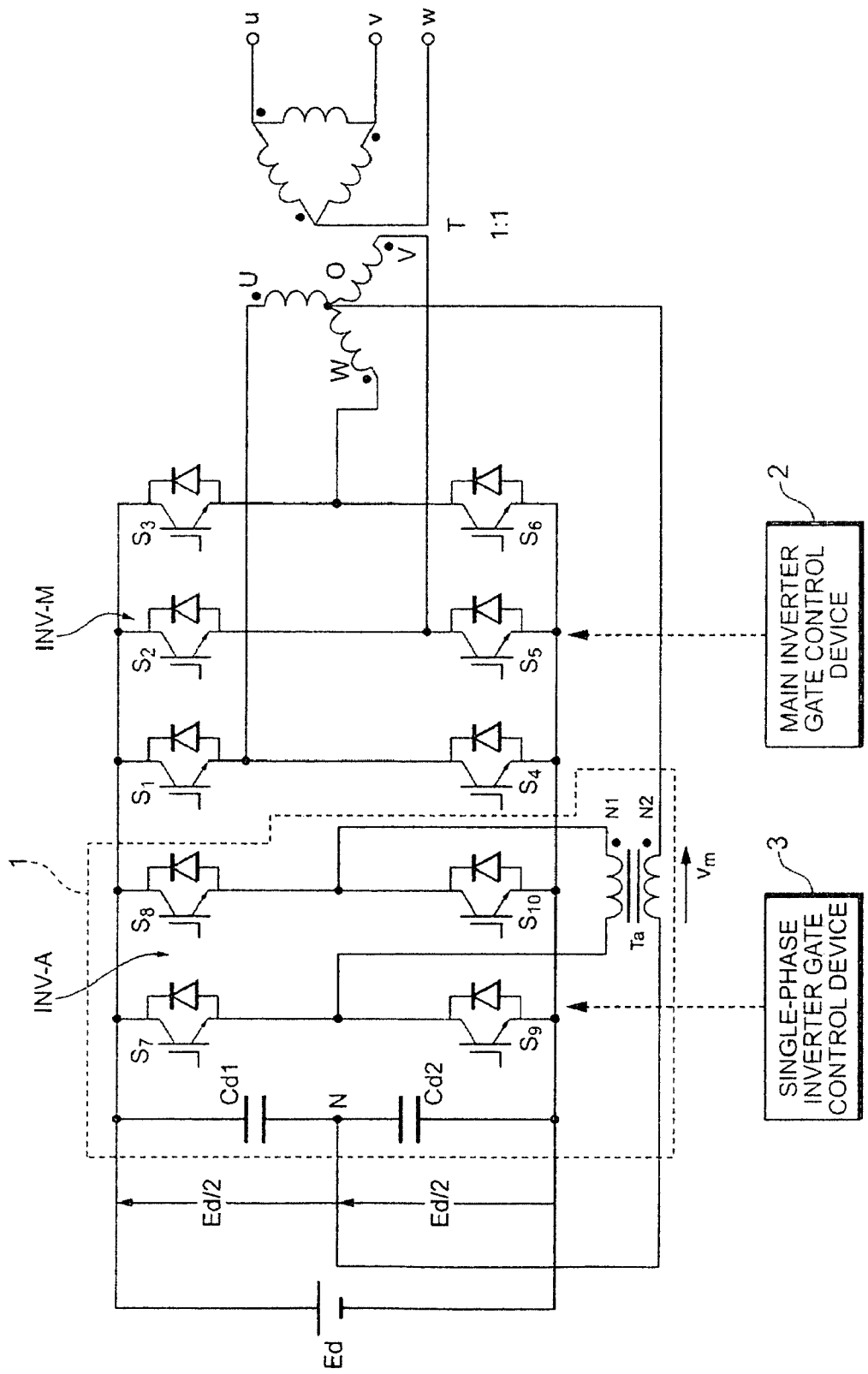
FIG. 1 is a circuit diagram showing the three-phase voltage source inverter system in an embodiment of the invention.

FIG. 1 shows a three-phase voltage source inverter system in the present embodiment of the invention. The three-phase voltage source inverter system is provided with: a direct-current power source Ed; a main inverter unit INV-M consisting of switching elements S1-S6; an output transformer T; and an auxiliary circuit 1 surrounded with dashed lines. Self turn off type switching elements, such as IGBT, are utilized as the switching elements S1-S6 of the main inverter unit INV-M. The output transformer T is a three-phase transformer with Y winding-Δ winding.

The auxiliary circuit 1 consists of: auxiliary switching elements S7-S10 constituting single-phase inverter unit INV-A; an auxiliary transformer Ta; and two capacitors Cd1, Cd2 dividing the direct-current power source Ed into two voltages. The primary side winding in the auxiliary transformer Ta is connected between connection points of the above and below auxiliary switching elements in each phase, and the secondary side winding in the auxiliary transformer Ta is connected between a connection point N between the capacitors Cd1, Cd2 and a neutral point O of the output transformer T.

Figure 2:
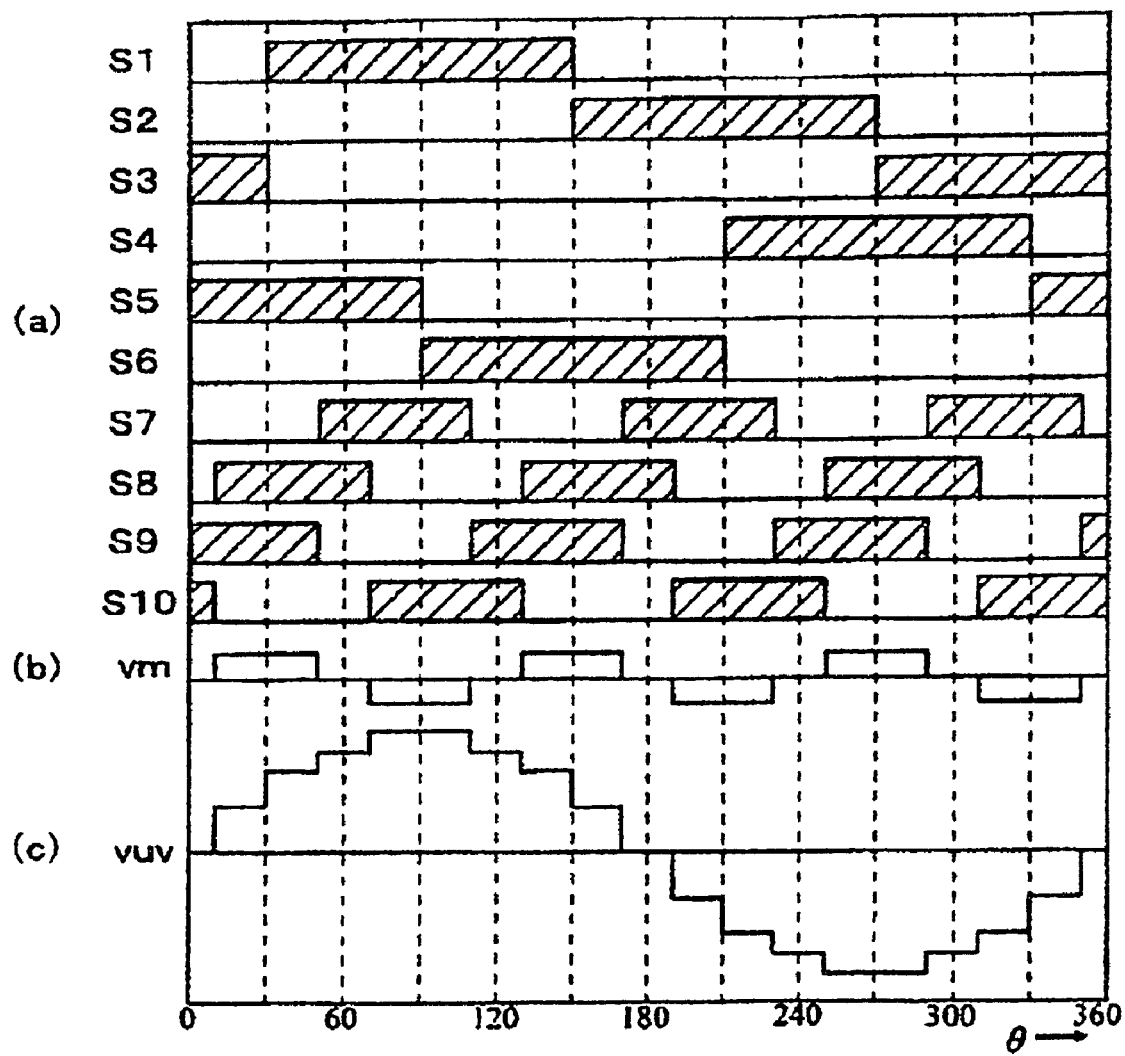
FIG. 2 shows an inverter control pulse waveform diagram and an output voltage waveform diagram in the aforementioned embodiment.

Next, the operations in the three-phase voltage source inverter system having the aforementioned configuration will be described. FIG. 2 shows the pulse patterns of switching elements S1-S10 and the line-to-line voltage waveforms of the auxiliary transformer Ta and the output transformer T. The switching element of a normal voltage source inverter conducts for 180° period. However, in the system of the present embodiment, each of the switching elements S1-S6 of the main inverter unit INV-M conducts during the 120° period by means of a main inverter gate control device 2.

Meanwhile, the switching elements S7-S10 constituting the single-phase inverter unit INV-A of the auxiliary circuit 1 asymmetrically controls a secondary side winding voltage vm in the auxiliary transformer Ta to be an intermitted rectangular wave voltage consisting of the tripled frequency of an output voltage by means of a single-phase inverter gate control device 3. For example, since the switching elements S3, S5 are "ON" during the period in which θ is 0°-30°, the phase voltage of the primary side windings VO and WO of the output transformer T and the line-to-line voltage between the secondary side windings vw and wu are expressed by the formulas:

[Formula 1]

$$v_{VO} = v_{vw} = v_{VN} - v_m = -\frac{E_d}{2} - v_m$$
$$v_{WO} = v_{wu} = v_{WN} - v_m = -\frac{E_d}{2} - v_m$$
(1)

Based on the circuit configuration, the total sum of the secondary side winding voltages of the output transformer T is expressed by the formula:

[Formula 2]

$$v_{uv} + v_{vw} + v_{wu} = 0$$
(2)

Therefore, according to formulas 1 and 2, the secondary side winding voltage $v_{uv}$ of the output transformer T is expressed by the formula:

[Formula 3]

$$v_{uv} = -(v_{vw} + v_{wu}) = 2v_m$$
(3)

Meanwhile, based on the pulse patterns of the auxiliary switching elements S7-S10, the output voltage vm of the auxiliary transformer Ta results in the following values:

[Formula 4]

$$v_m = 0 \quad (\theta: 0\text{-}10°)$$
$$v_m = kE_d \quad (\theta: 10\text{-}30°)$$
(4)

Here, k represents the turn ratio of the auxiliary transformer Ta, and the k is defined as k=N2/N1, wherein the number of turns of the primary side winding is indicated by N1 and the number of turns of the secondary side winding is indicated by N2.

Accordingly, the secondary side winding voltage of the output transformer T during the period in which the θ is 0°-10° based on the formulas 2, 3, and 4 is expressed by the formula:

[Formula 5]

$$v_{uv} = 0 \quad v_{vw} = -\frac{E_d}{2} \quad v_{wu} = \frac{E_d}{2}$$
(5)

Furthermore, during the period in which the θ is 10°-30°, the secondary side winding voltage of the output transformer T expressed by the following formula is obtained.

[Formula 6]

$$v_{uv} = 2kE_d \quad v_{vw} = -\frac{E_d}{2} - kE_d \quad v_{wu} = \frac{E_d}{2} - kE_d$$
(6)

When the output voltages of respective steps in the output transformer T are obtained in the same manner, the output voltage $v_{uv}$ is improved to have a staircase waveform equivalent to the staircase waveform consisting of 18 steps per cycle, and the output voltages $v_{vw}$ and $v_{wu}$ have waveforms respectively 120° delayed from the waveform of the output voltage $v_{uv}$.

Figure 3:
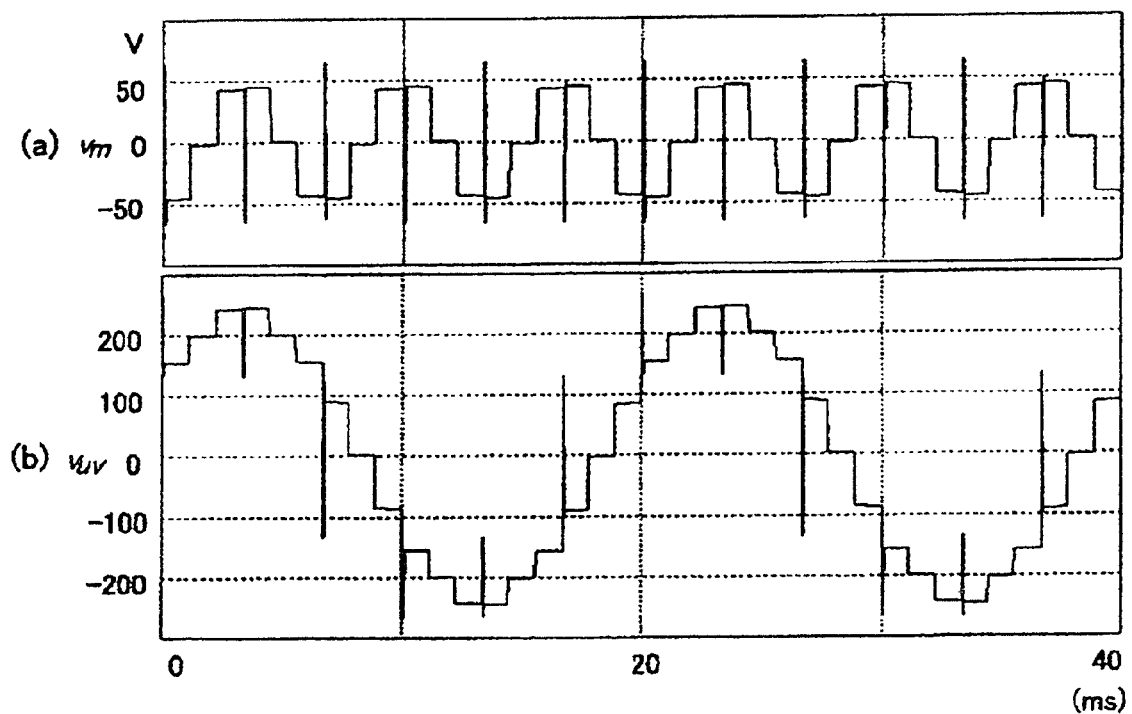
FIG. 3 shows the secondary winding voltage waveform diagram of an auxiliary transformer (FIG. 3(a)) and an output voltage waveform diagram (FIG. 3(b)) for the simulation result in the three-phase voltage source inverter system in the aforementioned embodiment.
Figure 4:
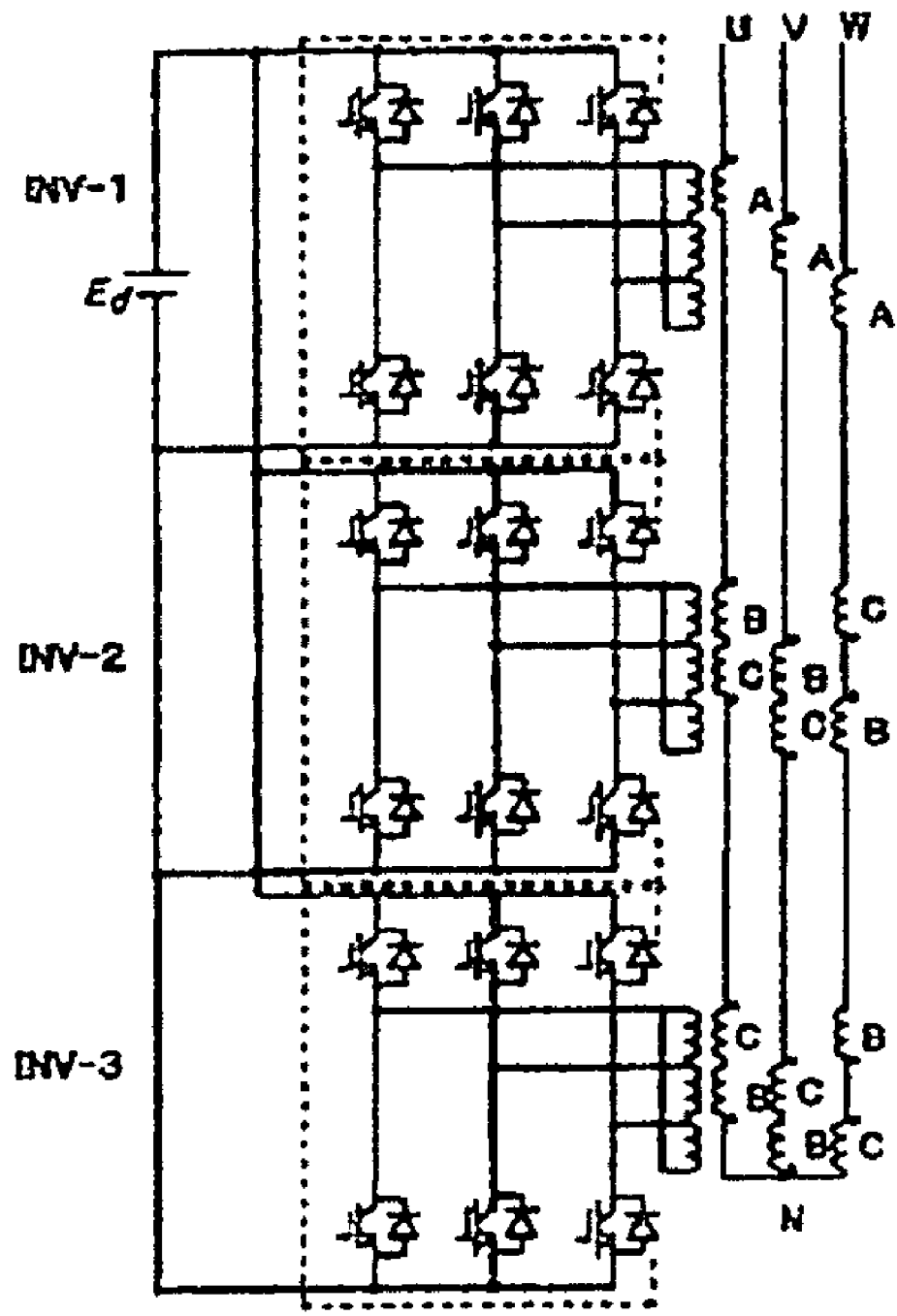
FIG. 4 is a circuit diagram showing the existing three-stage cascade arrangement-type three-phase inverter system.
Figure 5:
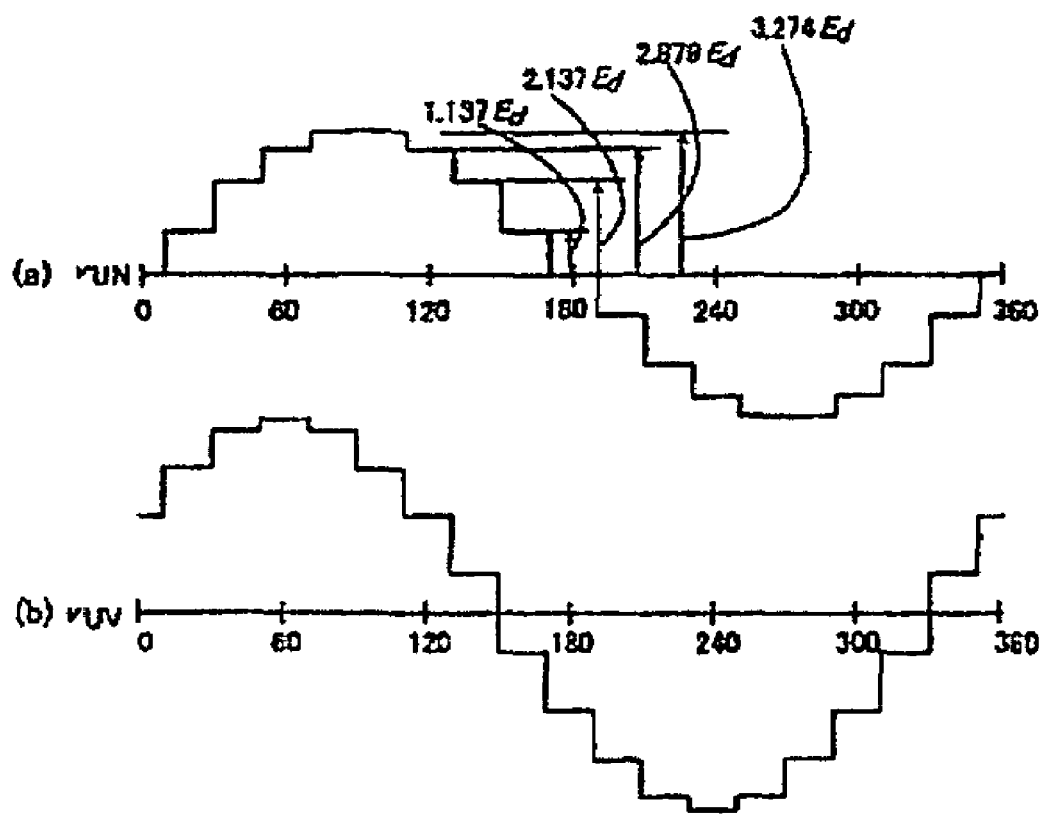
FIG. 5 is the output voltage waveform diagram of the existing three-stage cascade arrangement-type three-phase inverter system.

FIG. 3 shows simulated waveforms when the direct-current power source voltage Ed=400 v, load impedance is 10Ω, and the lagging power factor is 80%. As is clear from FIG. 3, the output voltage vm of the auxiliary transformer Ta is an intermitted rectangular wave voltage having three times the output frequency. Also, the output voltage of the output transformer T is made to have a waveform with 18 steps per cycle by the operations in the auxiliary circuit 1

Incidentally, the simulation result shown in FIG. 3 shows the output voltage has surge voltages at every 60° period. However, those surge voltages can be reduced by adding overlaps to the control pulse.

Another Embodiment

In the first embodiment, the switching elements S7-S10 is operated in the auxiliary circuit 1 having a single-phase inverter configuration. However, if the inverter of the auxiliary circuit 1 is a single-phase multilevel inverter, such as a two-level inverter, the output voltage $v_{uv}$ of the output transformer T will have a staircase waveform equivalent to a staircase waveform with 12 steps per cycle. Also, if the inverter of the auxiliary circuit 1 is a four-level inverter, the output voltage $v_{uv}$ of the output transformer T will have a staircase waveform equivalent to a staircase waveform with 24 steps per cycle; and if the inverter of the auxiliary circuit 1 is a six-level inverter, the output voltage $v_{uv}$ of the output transformer T will have a staircase waveform equivalent to a staircase waveform with 36 steps per cycle.

What is claimed is:

1. A three-phase voltage source inverter system comprising:

a direct-current power source;

a three-phase voltage source inverter apparatus including: a three-phase inverter unit in which ON-periods are respectively set to 120° for upper side switching elements in each of three phases with a 120° delay, and ON-periods are respectively set to 120° for lower side switching elements in each of the three phases with a 180° delay from the upper side switching elements and with a 120° delay between each phase; and a three-phase output transformer with a primary side Y winding connected to an output end in each of three phases of the three-phase inverter and a secondary side Δ winding; and an auxiliary circuit inserted between the direct-current power source and the three-phase voltage source inverter apparatus, including: a dividing capacitor, dividing a direct-current voltage of the direct-current power source; a single-phase inverter unit in which ON-periods are respectively set to 60° for upper side switching elements in each phase of single-phase with an 80° delay, and ON-periods are respectively set to 60° for lower side switching elements in each phase of single-phase with a 60° delay from the upper side switching elements and with an 80° delay between each phase; and an auxiliary transformer in which a primary side winding is connected to a connection midpoint between upper and lower switching elements in each phase of the single-phase inverter unit, and a secondary side winding is connected between a connection midpoint of the dividing capacitor and a connection midpoint of a primary Y winding in the three-phase transformer.

* * * * *